US009415735B1

(12) United States Patent
Baccouche et al.

(10) Patent No.: US 9,415,735 B1
(45) Date of Patent: Aug. 16, 2016

(54) VEHICLE DEFLECTION SYSTEM FOR IMPACT EVENTS

(71) Applicant: FORD GLOBAL TECHNOLOGIES, LLC, Dearborn, MI (US)

(72) Inventors: Mohamed Ridha Baccouche, Ann Arbor, MI (US); Rahul Arora, Royal Oak, MI (US); Matthew John Zaluzec, Canton, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/852,050

(22) Filed: Sep. 11, 2015

(51) Int. Cl.
*B60R 19/34* (2006.01)
*B60R 19/26* (2006.01)
*B60R 19/18* (2006.01)

(52) U.S. Cl.
CPC .......... *B60R 19/34* (2013.01); *B60R 2019/1826* (2013.01); *B60R 2019/1866* (2013.01); *B60R 2019/262* (2013.01)

(58) Field of Classification Search
CPC ...................................................... B60R 19/34
USPC ......................................................... 293/133
See application file for complete search history.

(56) References Cited

U.S. PATENT DOCUMENTS

| | | | |
|---|---|---|---|
| 3,888,502 A * | 6/1975 | Felzer | B60R 19/34 188/371 |
| 6,406,088 B1 | 6/2002 | Tate | |
| 7,000,975 B2 * | 2/2006 | Haneda | B60R 19/26 293/133 |
| 8,152,211 B2 * | 4/2012 | Klimek | B60R 19/34 293/102 |
| 8,297,668 B2 | 10/2012 | Nakanishi et al. | |
| 8,733,823 B2 * | 5/2014 | Brockhoff | B60R 19/34 293/133 |
| 9,102,289 B2 * | 8/2015 | Braunbeck | B60R 19/34 |
| 2013/0057000 A1 | 3/2013 | Patschicke et al. | |
| 2013/0300138 A1 * | 11/2013 | Banasiak | B60R 19/34 293/133 |
| 2014/0203578 A1 * | 7/2014 | Kaneko | B60R 19/34 293/133 |
| 2015/0021935 A1 * | 1/2015 | Baccouche | B62D 21/152 293/114 |
| 2015/0102615 A1 | 4/2015 | Alavandi et al. | |
| 2015/0108775 A1 * | 4/2015 | Nakanishi | B60R 19/34 293/133 |

FOREIGN PATENT DOCUMENTS

EP     2930068     * 10/2015

\* cited by examiner

*Primary Examiner* — Dennis H Pedder
(74) *Attorney, Agent, or Firm* — Jason Rogers; Brooks Kushman P.C.

(57) ABSTRACT

A vehicle includes a frame, a bumper, and a crush can that secures the bumper to the frame. The crush can includes a plurality of cells that are arranged in a fanned configuration relative to the frame such that walls of the cells deform during offset impact events to deflect objects away from the frame.

20 Claims, 2 Drawing Sheets

VEHICLE DEFLECTION SYSTEM FOR IMPACT EVENTS

TECHNICAL FIELD

The present disclosure relates to vehicle safety structures that are configured to protect vehicle passengers during an impact event.

BACKGROUND

Vehicles may include structures that are designed to absorb energy in order to protect vehicle passengers during an impact event.

SUMMARY

A vehicle includes a frame, a bumper, and a crush can that secures the bumper to the frame. The crush can includes a plurality of cells that are arranged in a fanned configuration relative to the frame such that walls of the cells deform during offset impact events to deflect objects away from the frame.

A vehicle includes a frame, a bumper that is secured to the frame by an impact absorber, and a plurality of adjacently arranged crush cans. The adjacently arranged crush cans are secured to and extend outwardly from the impact absorber in a fanned configuration such that walls of the crush cans deform during offset impact events to deflect objects away from the frame.

A vehicle includes a beam, a bumper, a frame, and a crush can. The beam has proximal and distal ends, and is secured to the bumper at the proximal end and the frame at the distal end. The crush can is secured to the beam between the proximal and distal ends. The crush can includes a plurality of cells that extend from the beam in a fanned configuration such that walls of the cells deform during offset impact events to deflect objects away from the frame.

DETAILED DESCRIPTION

Figure 1:
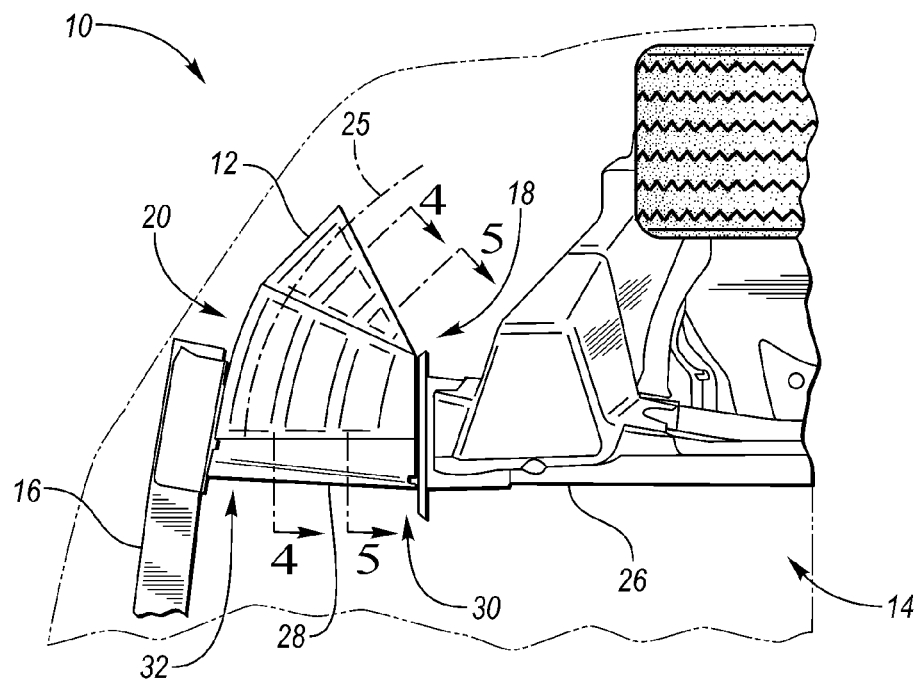
FIG. 1 is a plan view of a vehicle including a crush can disposed between a frame and a bumper.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Safety standards for vehicles being sold to the public include rating the amount of intrusion in the vehicle occupancy space after an impact. Crash tests are typically performed where vehicles are crashed into stationary objects in order to determine the amount of intrusion that occurs into various locations of the occupancy space. The crash tests include, among others, full frontal impacts into rigid barriers and small offset rigid barrier impacts. The full frontal impacts are meant to simulate collisions with large objects, while the small offset rigid barrier impacts are meant to simulate collisions with smaller objects such as telephone poles.

Structures within the vehicle, such as crush cans, may absorb energy during an impact event while other structures within the vehicle may deflect objects away from the vehicle. For example, an impact absorber, such as a crush can, may be disposed between the bumper and the frame of the vehicle in order to absorb energy during an impact event while a hook deflector may be secured to the end of the bumper to deflect objects outward from the vehicle during an impact event.

Hook deflectors may be useful in deflecting objects outward during small offset rigid barrier impacts. Hook deflectors, however, may not be beneficial during full frontal impacts since they are not designed to absorb energy during an impact event. On the other hand, crush cans disposed between the bumper and the frame that extend outwardly in a fanned configuration are capable of both deflecting objects during a small offset rigid barrier impact and absorbing energy during any type of impact.

Since crush cans disposed between the bumper and the frame that extend outwardly in a fanned configuration are capable of both deflecting objects during a small offset rigid barrier impact and absorbing energy during any type of impact, the amount of intrusion into the vehicle occupancy space may be decreased whether an impact is a small offset rigid barrier impact, a full frontal impact, or any other type of impact.

The amount of intrusion into the vehicle occupancy space may be measured at a variety of locations within the interior of the vehicle. For example, the amount of intrusion into the vehicle occupancy space may be measured at the footrest position of the front passenger side of the vehicle, the brake pedal position, the steering wheel position, the dashboard position, the instrument panel position, the position of the sill, or any other reference position within the vehicle occupancy space.

Also, utilizing crush cans disposed between the bumper and the frame that extend outwardly in a fanned configuration, as opposed to using hook defectors, may also decrease the overall vehicle weight. The decrease in the overall vehicle weight may be the result of the general shape of the crush cans, the material that the crush cans are made from, and/or the gage of the material used to construct the crush cans.

The decrease in weight resulting from the use of crush cans will help to increase the overall fuel economy of the vehicle, which is becoming an increasingly important metric for automobile manufactures due to more stringent governmental agency fuel economy standards and the increased cost of operating an automobile due the increased cost of gasoline.

Figure 2:
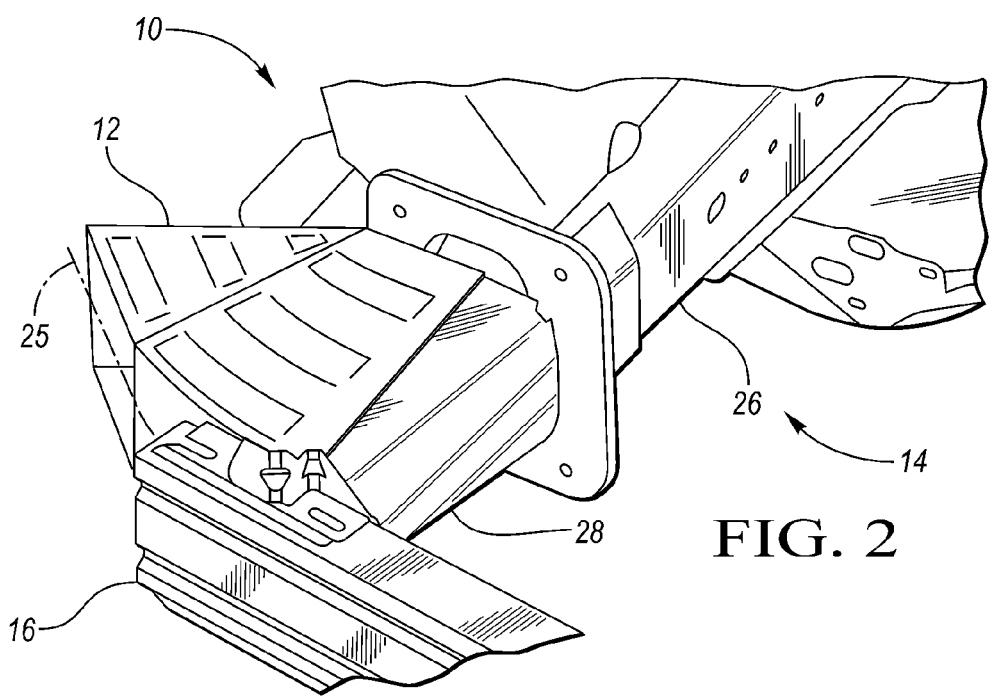
FIG. 2 is an isometric view of the vehicle including the crush can disposed between the frame and the bumper.
Figure 3:
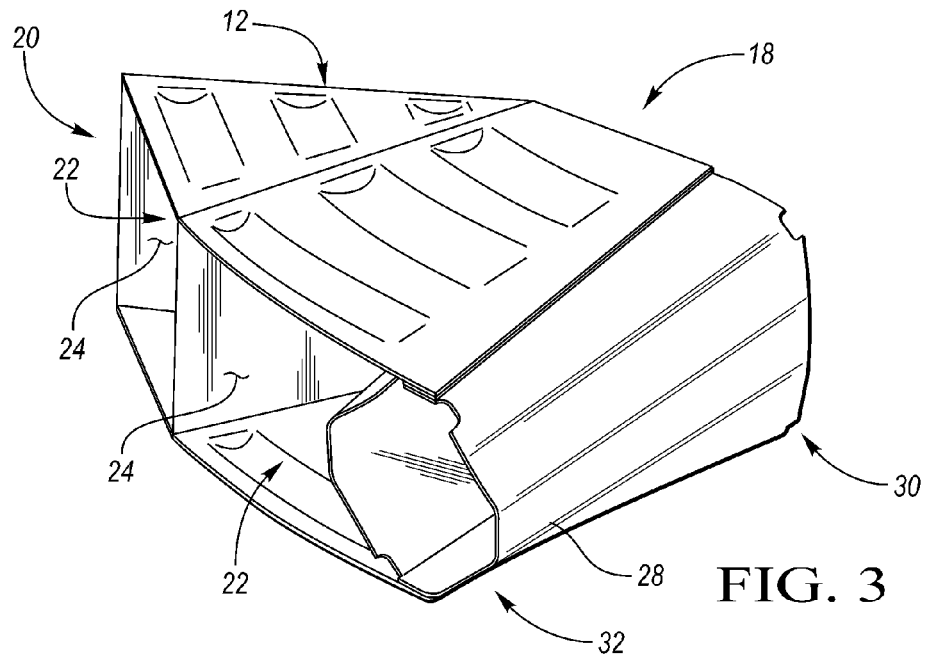
FIG. 3 is an isometric view of the crush can.

Referring to FIGS. 1, 2, and 3, a vehicle 10 that includes a crush can 12 disposed between a frame 14 of the vehicle 10 and a bumper 16 is illustrated. The crush can 12 may plastically deform during an impact even in order to absorb the energy of the impact event. The crush can 12 may directly secure the bumper 16 to the frame 14. A distal end 18 of the crush can 12 may be secured to the frame 14 while a proximal end 20 of the crush can is secured to the bumper 16.

The crush can 12 may include a plurality of cells 22 that are arranged in a fanned configuration relative to the frame 14 such that walls 24 of the cells 22 deform during offset impact events in order to deflect objects away from the frame 14. The plurality cells 22 may be arranged in the fanned configuration such that the proximal end 20 of the crush can 12 extends outwardly along an arc 25 relative to the frame 14. The crush can 12 may extend outwardly along the arc 25 such that the crush can 12 extends beyond a rail portion 26 of the frame 14.

Alternatively, a beam 28 may secure the bumper 16 to the frame 14, while the crush can 12 is secured to the beam 28. The beam 28 may also be in impact absorbing device, such as a crush can. A distal end 30 of the beam 28 may be secured to the frame 14 while a proximal end 32 end of the beam 28 may be secured to the bumper 16. The crush can 12 may be secured to the beam 28 between the proximal end 32 and distal end 30. The plurality of cells 22 of the crush can 12 may extend from the beam 28 in the fanned configuration such that the walls 24 of the cells 22 deform during offset impact events in order to deflect objects away from the frame 14. A first end of the crush can 12 (which may correspond to the proximal end 20 of the crush can 12) may be adjacent to the proximal end 32 of the beam 28 while a second end of the crush can (which may correspond to the distal end 18 of the crush can 12) may be adjacent to the distal end 30 of the beam 28. The plurality of cells 22 may be arranged in the fanned configuration such that the first end of the crush can 12 extends outwardly along the arc 25 relative to the frame 14.

Alternatively, the vehicle 10 may have a plurality of adjacently arranged crush cans 12. The plurality of adjacently arranged crush cans 12 may be secured to the beam 28 (which may be also an impact absorber, such as a crush can). The plurality of adjacently arranged crush cans 12 may extend outwardly from the beam 28 also in a fanned configuration such that the walls 24 of the crush cans 12 deform during offset impact events in order to deflect objects away from the frame 14.

Additionally, the adjacently arranged crush cans 12 may extended from distal ends 18 of the crush cans 12 (the distal ends 18 being adjacent to the frame 14) towards proximal ends 20 of the crush cans (the proximal ends 20 being adjacent to the bumper 16) such that the proximal ends 20 of the crush cans 12 extend outwardly in the fanned configuration along the arc 25 relative to the frame 14. At least one of the of the adjacently arranged crush cans 12 may extend outwardly beyond the rail portion 26 of the frame 14.

Figure 4:
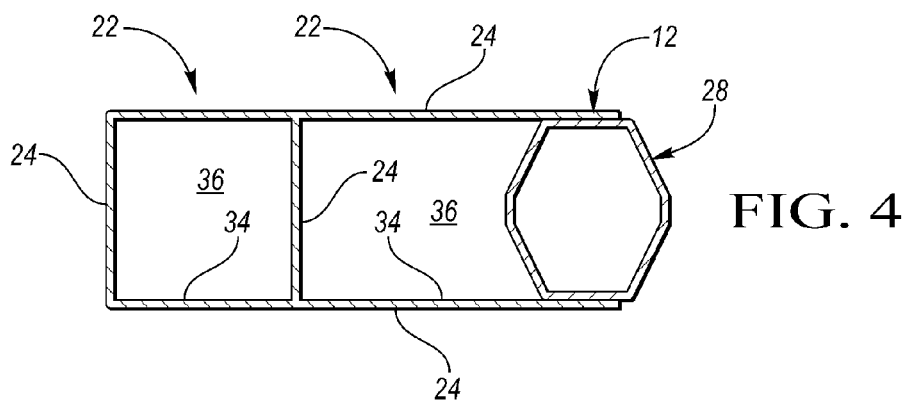
FIG. 4 is cross-sectional view taken along line 4-4 in FIG. 1.
Figure 5:
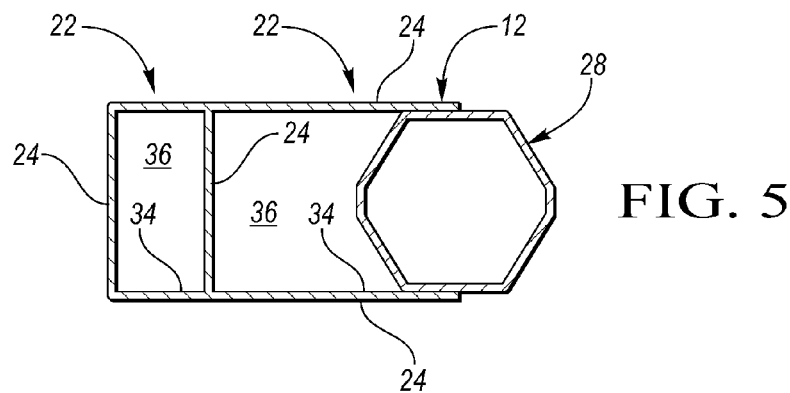
FIG. 5 is a cross-sectional view taken along line 5-5 in FIG. 1.

Referring to FIGS. 4 and 5, cross-sectional views of the crush can 12 and beam 28 taken along lines 4-4 and 5-5 in FIG. 1 are illustrated. The walls 24 of the cells 22 of the crush can 12 may form peripheries 34 that define closed cross-sections 36. The closed cross-sections 36 may consist of empty space or alternatively may be filled with impact absorbing material, such as a lightweight impact absorbing foam. Adjacent cells 22 of the crush cans 12 may share common walls that separate the adjacent cells 22.

The closed cross-sections 36 may taper extending along the crush can 12 from the proximal end 20 to the distal end 18. The taper of the closed cross-sections 36 is demonstrated by FIGS. 4 and 5, with the cross-section of FIG. 4 being closer to the proximal end 20 of the crush can 12 and larger in sized than the cross-section in FIG. 5.

Although the cells 22 of crush can 12 (or plurality of adjacently arranged crush cans) are arranged in a fanned configuration relative to the frame 14 such that walls 24 of the cells 22 deform during offset impact events in order to deflect objects away from the frame 14, the crush can 12 may also be effective in absorbing energy during a full frontal impact event where it may not be feasible to deflect an object during the impact event.

Therefore, utilizing a crush can with multiple cells or a plurality of adjacently arranged crush cans that are arranged in a fanned configuration provides both the benefits of hook deflectors that are utilized to deflect objects during small offset rigid barrier impact events and the benefits of crush cans or impact absorbers that are utilized to absorb energy during any type of impact event including small offset rigid barrier impact events and full frontal impact events.

The crush can 12 may be made from any material that is capable of both deflecting objects and absorbing energy during impact events. The crush can 12 may be made from metallic, plastic, composite, or other materials that are capable of deforming during impact events to either deflect an object or absorb energy.

For example, the crush can 12 may be made from steel, aluminum, magnesium, carbon fiber composites, or plastics. Preferably, the crush can 12 is made from steel and has a relatively small thickness in order to minimize the weight of the crush can 12. For example, the thickness of crush can 12 may range from 0.8 mm to 1.5 mm in order to minimize the weight of the crush can.

The closed cross-sections 36 of the crush can 12 may be empty spaces or may comprise lightweight materials in order to further minimize the weight of the crush can 12. For example, the closed cross-sections 36 may comprise an impact absorbing plastic, composite, or foam that would further increase the impact absorbing capabilities of the crush can 12 while at the same time minimizing the weight of the crush can.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a frame;
    a bumper; and
    a crush can securing the bumper to the frame and including a plurality of cells consecutively extending in an arced configuration outward from the frame laterally beyond an end of the bumper, the cells terminating along edges that increase in angular displacement relative to the bumper with each consecutive cell, wherein walls of the cells deform during offset impact events to deflect objects away from the frame.

2. The vehicle of claim 1, wherein a distal end of the crush can is secured to the frame and a proximal end of the crush can is secured to the bumper, and wherein the plurality of cells are arranged in the arced configuration such that the proximal end of the crush can extends outwardly along an arc relative to the frame.

3. The vehicle of claim 2, wherein the crush can extends outwardly beyond a rail portion of the frame.

4. The vehicle of claim 2, wherein the walls of the cells form peripheries defining closed cross-sections.

5. The vehicle of claim 4, wherein the closed cross-sections taper extending along the crush can from the proximal end to the distal end.

6. The vehicle of claim 1, wherein common walls separate adjacent cells of the plurality of cells.

7. The vehicle of claim 1, wherein the crush can is made of steel.

8. A vehicle comprising:
a frame;
a bumper secured to the frame by an impact absorber; and
a plurality of adjacently arranged crush cans secured to and consecutively extending in an arced configuration outwardly from the impact absorber beyond an end of the bumper, the crush cans terminating along edges that increase in angular displacement relative to the bumper with each consecutive crush can, wherein walls of the crush cans deform during offset impact events to deflect objects away from the frame.

9. The vehicle of claim 8, wherein the plurality of adjacently arranged crush cans are configured such that the crush cans extend from distal ends that are adjacent to the frame towards proximal ends that are adjacent to the bumper, and wherein the plurality of crush cans are arranged in the arced configuration such that the proximal ends of the crush cans extend outwardly along an arc relative to the frame.

10. The vehicle of claim 9, wherein at least one of the plurality of adjacently arranged crush cans extends outwardly beyond a rail portion of the frame.

11. The vehicle of claim 9, wherein the walls of the crush cans form peripheries defining closed cross-sections.

12. The vehicle of claim 11, wherein the closed cross-sections taper extending along the crush cans from the proximal ends to the distal ends.

13. The vehicle of claim 8, wherein the plurality of adjacently arranged crush cans is made of steel.

14. A vehicle comprising:
a beam having proximal and distal ends and secured to a bumper and a frame at the proximal and distal ends, respectively; and
a crush can secured to the beam between the proximal and distal ends and including a plurality of cells consecutively extending in an arced configuration outward from the beam laterally beyond an end of the bumper, the cells terminating along edges that increase in angular displacement relative to the bumper with each consecutive cell, wherein walls of the cells deform during offset impact events to deflect objects away from the frame.

15. The vehicle of claim 14, wherein a first end of the crush can is adjacent to the proximal end of the beam and a second end of the crush can is adjacent to the distal end of the beam, and wherein the plurality of cells are arranged in the arced configuration such that the first end of the crush can extends along an arc that extends outwardly relative to the frame.

16. The vehicle of claim 15, wherein the crush can extends outwardly beyond a rail portion of the frame.

17. The vehicle of claim 15, wherein the walls of the cells form peripheries defining closed cross-sections.

18. The vehicle of claim 17, wherein the closed cross-sections taper extending along the crush can from the first end to the distal end.

19. The vehicle of claim 14, wherein common walls separate adjacent cells of the plurality of cells.

20. The vehicle of claim 14, wherein the beam is also a crush can.

\* \* \* \* \*